United States Patent [19]

Beegle et al.

[11] Patent Number: 4,476,351

[45] Date of Patent: Oct. 9, 1984

[54] SUBSCRIBER LOOP CURRENT REGULATOR

[75] Inventors: Mark J. Beegle, Lisle; Mark W. Grimes, Lombard, both of Ill.

[73] Assignee: Rockwell International Corporation, Downers Grove, Ill.

[21] Appl. No.: 361,690

[22] Filed: Mar. 25, 1982

[51] Int. Cl.³ .......................................... H04M 19/00
[52] U.S. Cl. ...................................... 179/77; 179/70; 179/16 F; 323/278; 307/2
[58] Field of Search ............ 179/77, 70, 18 FA, 18 F, 179/16 F, 16 AA, 170 J; 323/278, 277, 349, 350; 307/2

[56] References Cited

U.S. PATENT DOCUMENTS 4,156,150 5/1979 Harrigan et al. ............... 323/278 X
4,314,106 2/1982 Bakker ........................... 179/16 F Primary Examiner—Stafford D. Schreyer
Attorney, Agent, or Firm—Carmen Patti; V. Lawrence Sewell; H. Frederick Hamann

[57] ABSTRACT

A current regulator for supplying dc power to a telephone line employs a resistor feed circuit in conjunction with a solid state feed circuit. The dc line current flowing through both such elements is monitored by a sensing circuit which drives the solid state element in a manner to maintain a desired magnitude of dc line current. The resistor value may be arbitrarily chosen so that the circuit power is shared in a desired proportion between the resistor and solid state element. When used in a telephone line in series with ac voice signals the regulator employs a capacitor and diode bridge arrangement to reduce the ac impedance thereof, improve longitudinal balance and allow bi-directional current.

6 Claims, 3 Drawing Figures

SUBSCRIBER LOOP CURRENT REGULATOR

BACKGROUND OF THE INVENTION

The present invention relates in general to telephony, and in particular to circuits for supplying dc current to telephone lines.

In one type of telephone line, such as a subscriber loop, dc current as well as ac voice signals are necessary for the transmission of voice intelligence. A telephone set connected to such loop requires dc current for the proper operation of the talking transmitter.

Owing to the fact that each subscriber loop requires a dc supply circuit, and large switching systems service up to 10,000 subscriber loops, such supply circuits should optimally be very efficient in transferring dc power to the line rather than dissipating power internally within the circuits. Moreover, the supply circuit elements contributing to the internal power consumption that does exist should be low cost and of physically small size so as to conserve circuit board or rack space.

It is well known in the art that the simplest line supply circuit consists of a pair of equal-valued resistors each placed in series with the respective loop tip and ring conductor. Such an arrangement requires physically large power resistors which, for short loop lengths, dissipate more power than is fed to the loop itself.

Filament lamp supply circuits represent an advantage over the resistor circuits insofar as the nonlinear temperature vs. resistance characteristics reduce internal power consumption when used in conjunction with short loops. However, these lamps are expensive, require significant space, and are not easily obtained.

Other solid state line supply circuits have been devised to feed dc current to telephone lines. Such circuits, one of which is disclosed in U.S. Pat. No. 3,649,769, exhibit linear current feed characteristics similar to the traditional resistor circuit and share the same disadvantage as noted before.

Many of the foregoing shortcomings are addressed in U.S. Pat. No. 4,056,691 which describes an efficient telephone subscriber line circuit for feeding a constant current to a subscriber set the magnitude of which is essentially independent of loop length. The basis of that feed circuit is a complicated and sophisticated switching regulator. While that arrangement achieves its objectives, it becomes economically impractical to utilize a number of such circuits in a system servicing more than several hundred subscriber loops.

As the sophistication of telephone line supply circuits increases, especially toward solid state units, impedance considerations must be observed when used in an environment which requires a balanced relationship between the tip and ring conductors. Solid state supply circuits generally exhibit a type of impedance which does not permit the supply to be inserted within the voice path of the telephone line. Therefore, as in noted U.S. Pat. No. 3,649,769 the supply circuit shunt feeds the telephone line and is accordingly designed to maintain a high impedance to the voice signals.

Accordingly, it is a primary object of the present invention to provide an economical and efficient battery supply circuit for feeding dc current to telephone lines as a function of line length, and for dissipating power in the circuit within low cost and moderate size components.

It is a related object of the present invention to provide a telephone line feed circuit wherein the internal power dissipation can be arbitrarily divided between a resistor and an transistor by the selection of the resistor value.

It is a further object of the present invention to provide a series subscriber loop regulator having a low ac impedance to thereby minimize longitudinal impedance imbalances between the telephone conductors.

The foregoing, as well as other objects and advantages of the present invention will become apparent from the detailed description of the invention which follows hereinafter, and when considered together with the appended drawings.

While this invention will be described in connection with certain embodiments presently considered to be preferred, there is no intent to limit it to these embodiments. On the contrary, the intent is to cover all alternatives, modifications and equivalents included within the spirit and scope of the invention as defined by the appended claims.

SUMMARY OF THE INVENTION

In accordance with one aspect of the invention, there is provided a telephone line battery supply regulator circuit having a solid state element for feeding dc current to the line as a function of line length. A resistive element is also provided for feeding dc current to the line. The dc current of both the solid state and resistive elements are monitored and the solid state element is correspondingly driven in a relationship inversely proportional to the total line current. In this manner the line current is maintained at a predetermined level irrespective of whether it was derived from the solid state or resistive element.

Therefore, a resistor may be selected so that the power consumed by the resistor will allow the solid state element to dissipate the remaining power without the use of a costly and bulky heat sink. Since resistors can be automatically inserted into printed circuit boards, whereas heatsinks are mounted manually, a saving in cost, space and labor is achieved.

In the preferred embodiment, one supply regulator according to the present invention is utilized in the tip conductor of the subscriber loop, and another regulator is utilized in the ring conductor to maintain a balanced impedance relationship with respect to ground so as to minimize longitudinal effects. Balance is further enhanced by bridging a large capacitor across each regulator. The effect of the placement of such a capacitor is to present a very low ac impedance to the voice frequencies so that the impedance of the regulator becomes negligible. Each line supply regulator is then nested in a diode bridge arrangement, and connected across the capacitor, so that the supply regulator conducts bi-directionally. This is the result of large induced longitudinal currents. This combination allows the capacitor to maintain the correct average voltage, thereby further improving longitudinal balance.

DESCRIPTION OF THE PREFERRED EMBODIMENT

Figure 1:
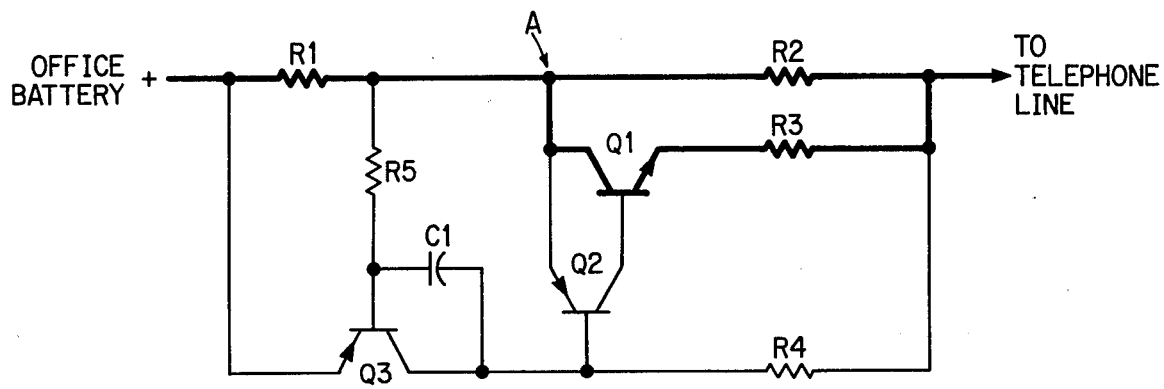
FIG. 1 is a detailed schematic diagram of the telephone line dc current regulator according to the present invention.

Referring now to FIG. 1, there is shown the battery supply regulator circuit of the present invention. The supply regulator circuit is connected in a series relationship between the office battery and the telephone line. Not shown is one loop conductor extending to the subscriber telephone set, and another loop conductor returning to the central office for completing an electrical dc circuit to a negative battery supply or ground.

The circuit of FIG. 1 being a current regulator, is best described in terms of circuit currents. The majority of dc current enters the telephone line by way of the resistor R2 path and/or the transistor Q1 and resistor R3 path. It should be noted that node A is the junction at which line current is divided between the noted paths. The heavy lines illustrate the portions of the circuit for supplying the bulk of the dc line current.

Resistor R1 is a small-valued resistor for sensing the line current. It is highly desirable to minimize series resistance within the regulator circuit so that the office battery power is expended in driving the line rather than being dissipated in the driving circuitry. The magnitude of line current flowing through resistor R1 develops a voltage representative of the magnitude of such current.

PNP transistor Q3 is a control transistor having its base and emitter connected across (by way of base resistor R5) the sensing resistor R1 and poled in such a direction that increases in resistor R1 voltage produce corresponding increases in the conductivity of transistor Q3. R5 limits the base current of transistor Q3 in the event large voltage transients or spikes occur on the subscriber line. Capacitor C1 adds stability to the circuit and thereby prevents circuit oscillations.

To understand the operation of the circuit, FIG. 1 will now be discussed in terms of line currents increasing from a minimum to a maximum permissible value. In the practical application of the circuit, this situation can exist in at least two situations, to wit; where, for a given line length, the office battery potential increases, or where, for a given office battery potential, lines of various lengths are driven by the regulator. For small line currents the resistance of R1 is selected so that the voltage developed thereacross is insufficient to forward bias the emitter-base junction of Q3. Thus, at low line currents, transistor Q3 is essentially removed from the circuit.

In this situation, the Q2 emitter-base and resistor R4 current path exists so as to forward bias the emitter-base junction of Q2 and thereby permit Q2 collector current to flow. It should be noted that the emitter of Q2 is essentially now at the battery potential. Q1 base current, being supplied by the Q2 collector, allows the main transistor Q1 to conduct loop current through resistor R3 to the telephone line. It is seen then, that in this situation the bulk of line current is supplied by way of the Q1/R3 path. Therefore, in accordance with one aspect of the invention, the circuit operation involving small loop currents, and therefore long line lenghts, Q1 is saturated to minimize the circuit resistance so that battery power is expended in the loop rather than in the feed circuit. Resistor R3 must be optimized so as to protect transistors Q1 and Q2 against damage from currents in excess of that normally encountered in feeding telephone lines and to keep the Q1/R3 path resistance low for long loops. Biasing resistor R4 is a relatively large-valued resistor for providing Q2 emitter base current.

In the example, as line current continues to increase, and for the reasons previously mentioned, the voltage developed across R1 begins to forward bias the emitter-base junction of control transistor Q3. As the R1 voltage continues to increase, a point is reached where the Q3 emitter-base is sufficiently forward-biased to saturate the control transistor. It should be realized that Q3, in the saturated state, essentially places the office battery potential at the base of Q2. Noting that the voltage at the emitter of Q2 is less than the voltage at its base (due to the voltage drop across R1) and therefore reverse biased, transistor Q2 becomes cut-off. In this state, a small amount of Q3 collector current flows through the resistor R4 to the telephone line. However, the major portion of line current is now delivered to the loop by way of the resistor R2.

In the transition region between Q3 cut-off and saturation, transistor Q1 traverses its active region and line current is delivered through both resistor R2 and R3. For telephone subscriber loop applications it has been found that resistor R2 values in excess of about 500 ohms are adequate in order for the transistor Q1 to maintain control and regulate the current to achieve substantially a constant magnitude thereof. It may be observed that for small R2 resistor values, too much current may be supplied to the line in spite of the fact that transistor Q1 is entirely biased to cut-off.

It should be understood that the magnitude of telephone line current supplied by the circuit of FIG. 1 is controlled as a function of the R1 resistor value rather than of the values of resistors R2 or R3. Moreover, since resistor R2 and transistor Q1 current are both monitored, the transistor Q1 is operative to increase or decrease line current to the desired magnitude. In other words, transistor Q1 is controlled to compensate for the lack, or the excess line current supplied by the resistor R2 so that a desired line current is maintained.

In accordance with an object of the present invention, the value of resistor R2 may be chosen to supply a portion of the total line current, and thus share in the circuit power dissipation in an amount which relieves the transistor Q1 of the need of an expensive heat sink. As long as the resistor R2 value is large enough for transistor Q1 to maintain control of the dc current level, such value may be arbitrarily chosen to accommodate a cost, space and labor constraint.

Figure 2:
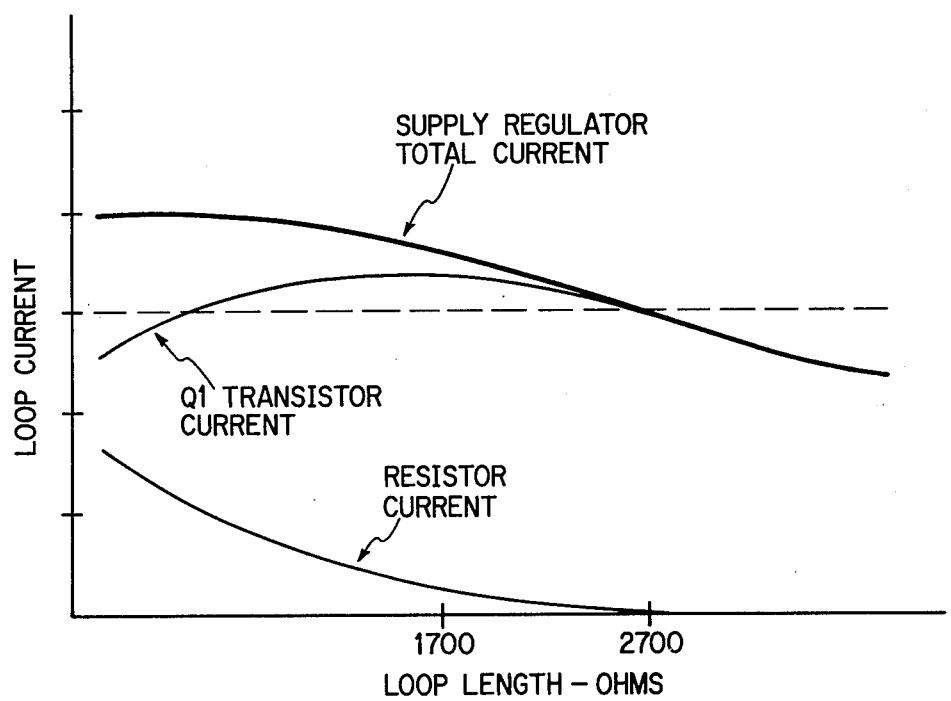
FIG. 2 is a graphical illustration of the dc line current supplied by the regulator resistor and the transistor as a function of subscriber loop length.

Turning now to FIG. 2, the graphical illustration shows the current characteristics of the non-linear supply regulator of the present invention. A constant supply voltage is assumed while the line length remains a variable. The dashed line represents the 30 milliamp level of line current used in the telephone art for adequately powering standard subscriber telephone sets so that voice conversations may be carried on at normal voice levels. Line currents of levels low than 30 may require persons to speak correspondingly louder to be understood at the distant end.

Viewing FIG. 2 in conjunction with FIG. 1, it may be observed that for short line lengths, representative of traditionally large line currents, the sensing resistor R1 is responsive to such high current to deactivate the main transistor Q1 so that the circuit gradually replaces the low impedance transistor path with that of the resistor R2. As a consequence, the current is thereby reduced and the power consumed by the regulator is accordingly reduced.

The graph further illustrates that for increasing line lengths, the control transistor Q3, being responsive to the R1 resistor voltage, is operative to control the Q2/Q1 combination so that the gradual transition of conductivity transfers current from the R2 path to the Q1/R3 path. Therefore, it may be observed that for long line lengths, and hence smaller loop currents, the voltage across sensing resistor R1 is reduced sufficiently so that Q3 is inoperative to control the Q2/Q1 combination. Thereupon, the emitter-base junction of Q2 becomes forward biased through resistor R4. The main transistor Q1 becomes nearly saturated, whereupon the circuit resistance becomes essentially that of the R1 and R3 resistor combination. This resistor combination being small in value allows the maximum current, and thus power, to be delivered to the subscriber line rather than being dissipated in the feed circuit.

It should be noted that if resistor R2 were removed from the circuit the total current would remain essentially as shown in the figure. However, all current would then be carried by the main transistor Q1, and as a consequence the power rating thereof would have to be increased or a heat sink employed.

Beyond approximately 5,000 ohms of line resistance, most feed circuits are unable to supply sufficient line current. In these instances a range extension circuit is employed to boost the line current to the requisite value.

Figure 3:
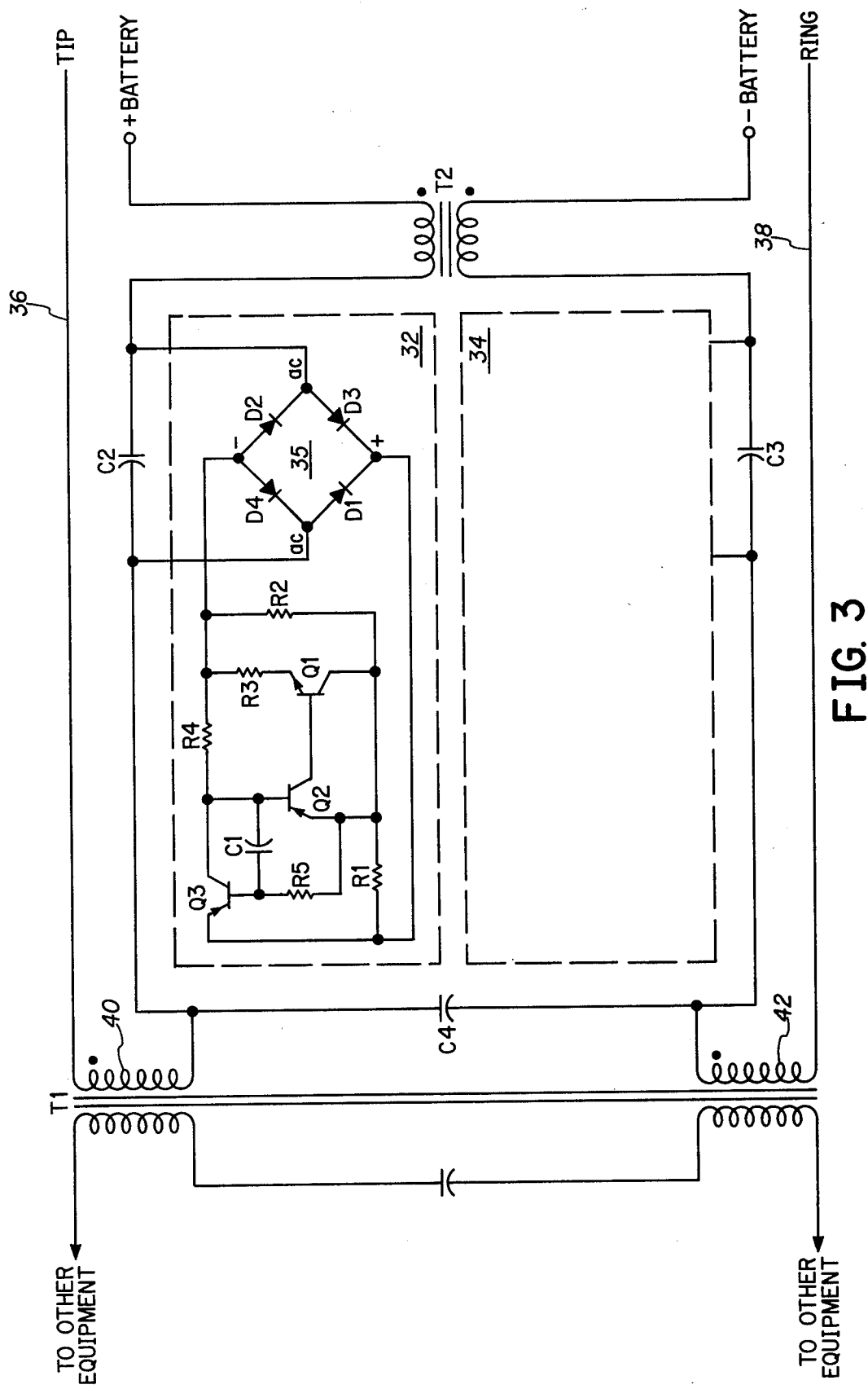
FIG. 3 is a schematic diagram illustrating a conventional seriesfed subscriber line interface circuit utilizing a current regulator according to the preferred embodiment of the present invention.

Utilizing the circuit as shown in FIG. 1, an embodiment having the components of the following values was constructed and successfully tested:

Transistor Q1: TIP 29C
Transistor Q2: 2N5401
Transistor Q3: 2N5401
Resistor R1: 15 ohms
Resistor R2: 2400 ohms
Resistor R3: 22 ohms
Resistor R4: 10,000 ohms
Resistor R5: 470 ohms
Capacitor C1: 0.0022 microfarads In summary, the supply regulator of the present invention is capable of feeding a telephone line in a nonlinear manner which reduces line current for short lines and transfers maximum power to lines of longer length. Moreover, the total power consumed by the supply regulator is shared between a resistor and a main transistor to reduce component cost and to conserve circuit board space. With reference now to FIG. 3, there are shown the details of a subscriber line interface circuit such as would be found in connecting a telephone switching system to a subscriber loop having attached thereto a station telephone set. The subscriber interface circuit includes a transformer T1 for coupling subscriber loop voice signals to the switching system equipment. The station side of the transformer is comprised of two sets of windings (40, 42), oppositely polarized, and connected with a capacitor C4 of value essentially equal to the capacitance of the subscriber telephone set so that the impedance of the interface circuit is matched to that of the subscriber set. The dc current path from the tip 36 and ring 38 conductors extends through the coupling transformer windings 40, 42 through the longitudinal inductor T2 windings to the battery.

The windings of the longitudinal inductor T2 are magnetically coupled and phased so that in-phase signals of the same amplitude appearing on the tip and ring conductor are presented with a high ac impedance, to keep the common mode currents low, such that they will be cancelled by transformer T1. The foregoing ac impedance balance to ground is achieved only for such ac voltages where the tip and ring impedances to ground are equal. It is important therefore, that a line supply circuit interposed in series with the tip and ring conductors does not disturb this balanced relationship. In other words, the impedance of the tip conductor regulator 32 should be, ideally, exactly equal to that of the ring conductor regulator 34.

While it is possible to select matched components for each regulator to assure equal impedances, it is a simpler matter to bridge each regulator with a large capacitor C2, C3 (having relatively low ac impedance to voice signals), whereby the impedance of each regulator becomes negligible with respect to its associated capacitor impedance. The solid state circuit appears as a diode in parallel with the capacitor. For large longitudinal voltages, such equivalent diode would allow a charge to build up on the capacitor thereby shunting the capacitor for one half of each ac cycle. Such a situation would disturb the balance of the circuit.

To deal with this, the present invention provides for a diode bridge circuit 35, in parallel with the capacitor C2, and arranged so that the supply circuit regulator "looks" like a bi-directional device to the capacitor. With this arrangement, a charge due to large longitudinal voltages does not build up on the capacitor C2, and therefore the balance of the entire circuit is maintained.

Specifically, currents resulting from large longitudinal positive voltages on the tip conductor 36 enter the regulator circuit 32 by way of bridge diode D1 and exit the regulator by way of bridge diode D2. Conversely, currents resulting from large longitudinal negative voltages on the tip conductor 36 enter the regulator 32 by way of bridge diode D3 and exit therefrom by way of diode D4.

In many situations where a supply circuit serially feeds dc current to a line, such circuit must also present a low ac impedance to the 30 Hz ringing voltage used to activate the telephone set bell. The mentioned capacitors C2 and C3 alternatively serve as a low impedance paths for ringing signals.

In summary, in those applications where the loop current regulator must present a low ac impedance path, such as for instance in the ac voice path, the capacitor-diode bridge combination can be advantageously utilized to maintain a balanced circuit condition in spite of longitudinal voltages present on the lines. It may now be understood that the capacitor and bridge arrangement may be utilized in combination with other types of series line fed circuits exhibiting rectifier characteristics.

A second current regulator 34 according to the present invention is interposed within the telephone ring conductor 38, as shown in FIG. 3. The second current regulator 34 is identical to the described tip conductor regulator 32 and is used solely for offsetting the impedance effects of the tip conductor regulator. The discussion as set forth in regard to the tip conductor regulator 32, and its accompanying bridge 35 and capacitor C2 circuit, applies equally as well to the ring conductor regulator 34, and thus will not be further delineated here.

It should be understood that various situations can arise in which the office battery polarity is reversed in relation to the tip 36 and ring conductor 38. In this situation, the bridge circuits associated with the tip regulator 32 and ring regulator 34 serve as a mechanism by which such regulators can supply dc power to the loop irrespective of the office battery polarity.

With the foregoing principles in mind, it should be noted that while the loop current regulator of the present invention is discussed in terms of serially feeding a subscriber loop, such a regulator can also find applications in shunt feeding a telephone subscriber loop. However, a supply regulator shunt feeding a loop does not appear in series with the voice transmission path, and thus it must present a high ac impedance to the telephone line. A method of shunt feeding a loop is clearly set forth in the U.S. Pat. No. 3,649,769. It is beyond the necessary scope of the present disclosure to detail the manner in which one would modify the loop current regulator according to the present invention so that a high impedance to ac signals is maintained.

The foregoing illustrates the principles by which the present invention functions to achieve the desired objectives. Of course, changes may be made to the regulator circuit which are not relevant to the novel features as taught herein. Bearing this in mind, the specific embodiments disclosed herein are intended to be merely exemplary of the invention and not restrictive thereof since various modifications readily apparent to those familiar with the art, can obviously be made without departing from the spirit and scope of the invention as claimed hereinbelow.

What we claim is:

1. A battery supply regulator circuit for supplying DC current to a telephone line, comprising:
   means for sensing the magnitude of the DC current in said line;
   controlling means for carrying a first portion of said current supplied to the line, and for controlling said portion in response to the magnitude sensed by said sensing means with the goal of maintaining the DC current flowing in said line near a preselected value;
   a resistor (R2) for carrying substantially the remaining portion of the current supplied to the line, thereby dividing the power dissipation in the regulator circuit between the resistor and the controlling means; and
   means for providing balance to the regulator connected to said sensing means, controlling means and resister (R2).

2. The circuit of claim 1, wherein said circuit is connected in said line in a serially feeding configuration, and the current flowing in said line divides substantially into said first portion and said remaining portion.

3. The circuit of claim 2, wherein
   said means for sensing includes a resistor (R1) substantially carrying the DC current flowing in said line, and
   said controlling means includes a transistor (Q1) for carrying said first portion of said current, and includes a transistor (Q3) driven in response to the current through said resistor (R1) for controlling the conduction of said transistor (Q1).

4. The circuit of claim 1, wherein said resistor (R2) is greater than 500 ohms, whereby said controlling means can effectively maintain the DC current flowing inside the line near said preselected value.

5. The circuit of claim 1, wherein said means for providing balance comprises:
   a full bridge rectifier interposed within said line and connected to said sensing means, controlling means and resistor (R2) so that said controlling means and said resistor (R2) conduct bidirectional current present in said line; and
   a capacitor bridging said controlling means so that the AC impedance thereacross is low to signals in the voice frequency range.

6. A battery supply regulator circuit for supplying DC current to a telephone line, comprising:
   a transistor for carrying DC current supplied to said line;
   means for driving said transistor to carry a controlled portion of said current supplied to said line; and
   means for providing balance to the regulator including a full bridge rectifier interposed within said line and connected to said transistor so that the transistor conducts bidirectional current present in said line and a capacitor bridging said rectifier, so that the AC impedance thereacross is low to AC signals in the voice frequency range.

* * * * *